United States Patent [19]

Poland

[11] Patent Number: 4,641,819
[45] Date of Patent: Feb. 10, 1987

[54] FLEXIBLE ASSEMBLY JIG
[75] Inventor: David A. Poland, Hawthorne, Calif.
[73] Assignee: Northrop Corporation, Hawthorne, Calif.
[21] Appl. No.: 588,839
[22] Filed: Mar. 12, 1984
[51] Int. Cl.⁴ .............................................. B23P 17/00
[52] U.S. Cl. ..................... 269/45; 269/71; 901/15; 29/281.6
[58] Field of Search ............... 414/744 A; 901/6, 15; 269/71, 37, 45, 32; 29/281.1, 281.6

[56] References Cited

U.S. PATENT DOCUMENTS 2,669,958  2/1954  Sweeney ............................. 269/45
4,508,327  4/1985  Ersoy ................................. 269/32

FOREIGN PATENT DOCUMENTS 801326   1/1951  Fed. Rep. of Germany ........ 269/45
2852821  4/1980  Fed. Rep. of Germany ... 414/744 A
320364   3/1972  U.S.S.R. ............................. 269/32

Primary Examiner—Frederick R. Schmidt
Assistant Examiner—Steven P. Schad
Attorney, Agent, or Firm—Terry J. Anderson; Robert B. Block; Michael B. Lachuk

[57] ABSTRACT

A flexible assembly jig for positioning a workpiece multi-dimensionally by a plurality of positioner units to enable a tool to operate thereon. Each positioner unit includes a locator adjustable in three-dimensions into unrestricted operative positions, including positions in horizontal fields overlapping the horizontal fields of operative positions of the locators of adjacent positioner units. The positioner units with the locators are movable into storage chambers of a diameter less than the maximum horizontal operating fields in which the locator is adjustable.

16 Claims, 6 Drawing Figures

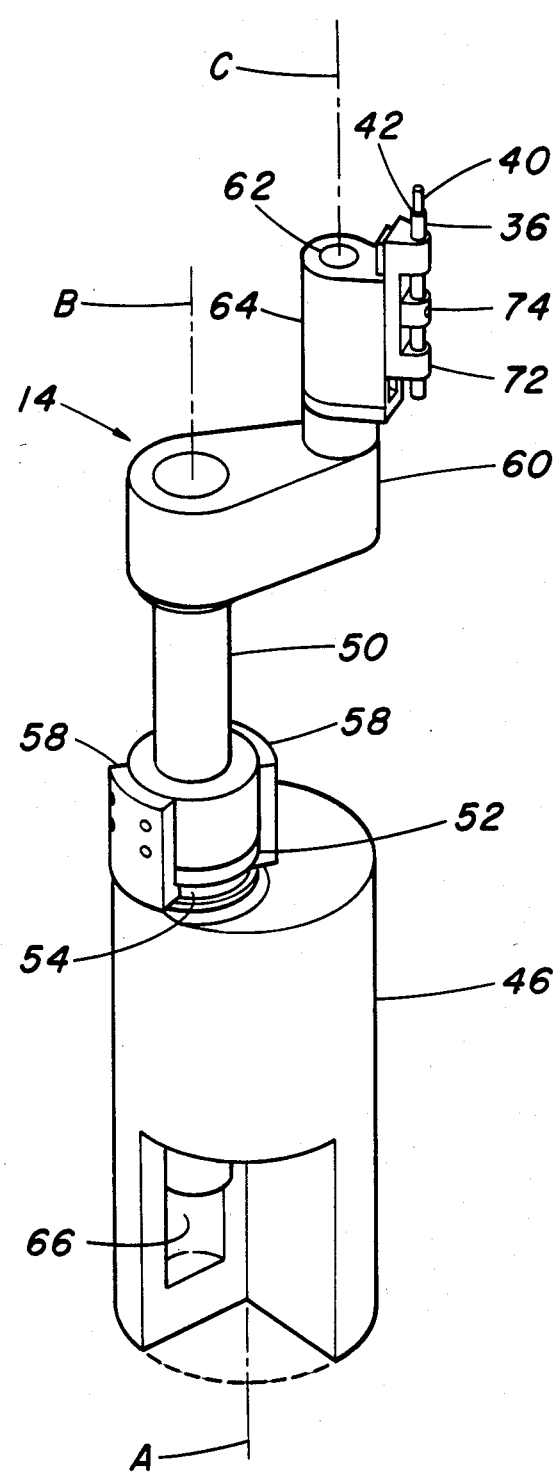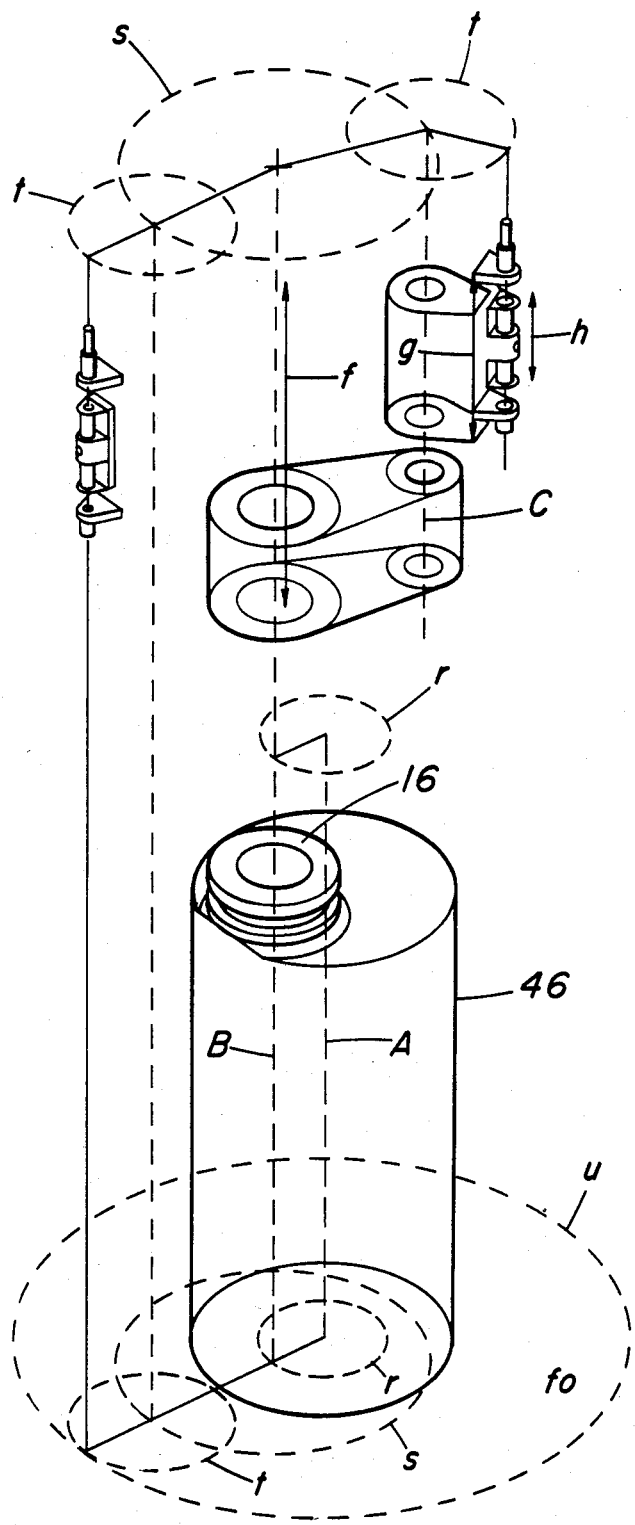
FIG 2
FIG 3

FLEXIBLE ASSEMBLY JIG

BACKGROUND OF THE INVENTION

Field of the Invention

The present invention relates to a flexible assembly jig having a plurality of independently adjustable workpiece positioners, which can locate and hold a variety of workpieces for assembly or machining processes. Particularly, the workpiece locators of the individual positioner units in this jig are adjustable to positions in operative fields which may overlap the fields of adjacent locators.

Usually workpiece assembly jigs are set-up for supporting a single workpiece for machining and/or assembly therewith of other components. The locator elements of such jigs are generally positioned for a single workpiece, and remain so positioned during the entire run of that workpiece. Thereafter, the jigs and their components are often scrapped, but may be cut apart and reconfigured to accommodate another workpiece. Generally, for short manufacturing runs, an excess of jig units are required to reduce expense, and time loss to handle workpieces. After completion of the run, the assembly jigs are torn down or stored thereby requiring greater than desired storage facilities, as well as larger than desired inventory investments.

The flexible assembly jig of the present invention provides for rapid set-up of the workpiece holder for positioning of a workpiece unit multi-dimensionally relative to a machine for operating on the workpiece. The several locators of the jig are controllable to enable ready change-over from handling one workpiece to handling another. The plurality of positioners, each supporting a locator pin are arranged adjacent one another over the full dimension of the work support area of the jig. The locators are positionable for use in an operative field sufficiently large as to permit overlapping the operative fields of locators adjacent positioners whereby locators may be positioned in close proximity one to another.

A control system, such as a computer, may be used to selectively position the locators three-dimensionally as required for handling a particular workpiece unit. By controllable power sources, the positioners carrying the locators are adjustable vertically from individual storage chambers to predetermined operative fields. Gross adjustment means thereafter establish a first axis about which an arm is movable for positioning of a second axis on the remote end of the arm. A locator carrier is rotatably adjustable about the latter axis to position the locator in an operative field which may be of greater diameter than the diameter of the cylindrical storage chamber. The locator carrier further includes provision for fine vertical adjustments of locator elements enabling highly precise engagement with the workpiece to be supported thereon.

The locators may be selected among locator studs or tips with or without ledges, clamps, shelves, and other workpiece positioning elements.

An object of the present invention is to provide a flexible assembly jig capable of rapid change-over for handling different workpieces.

Another object of the invention is to provide workpiece locators which can be adjusted to multi-dimensional coordinate positions.

Still another object of the invention is to provide for unrestricted positioning of locators in operating fields which may overlap operating fields of adjacent locators.

Yet another object is to provide compact storage chambers for the locators of the assembly jig, which storage chambers are of lesser dimensions than the operative fields within which the locators are able to operate.

The above and other objects of the invention will be more clearly seen when considered with the drawings, as follows:

FIG. 2 is an elevational view of a positioner unit;

FIG. 3 is a kinematic representation of the movement capabilities of components of the positioner unit;

Figure 5:
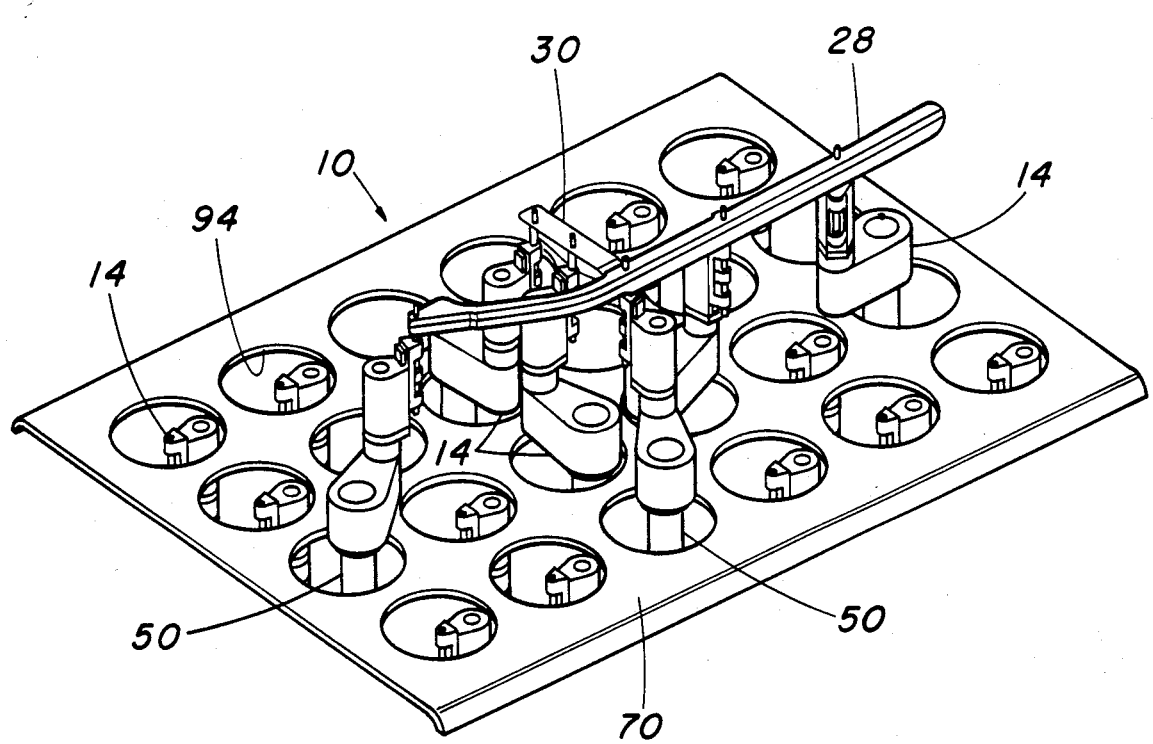
Figure 6:
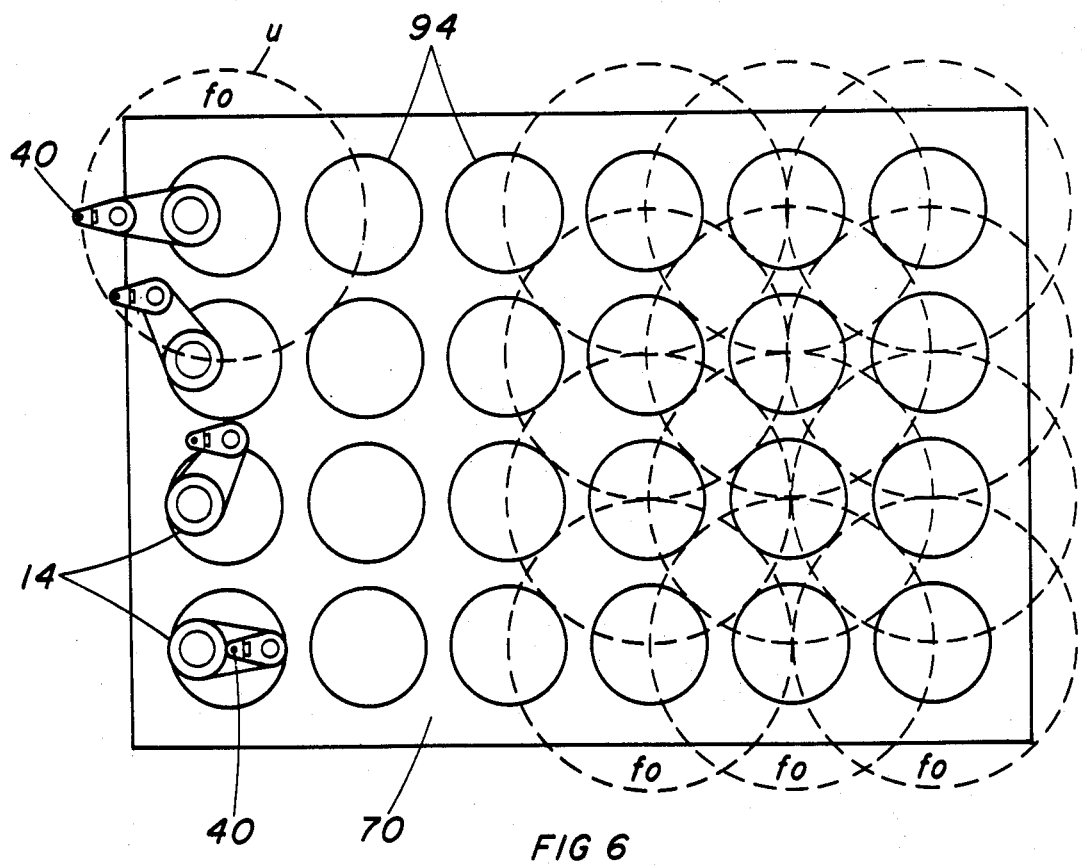

FIG. 5 is an view of the flexible assembly jig with several of the carriers elevated out of their respective chambers, and locators supporting workpieces; and FIG. 6 is a schematic representation, in plan, of the present invention showing typical positioners in various stages of deployment, and dashed lines representing the maximum operative fields within which individual locators or positioner units can operate.

DETAILED SPECIFICATION

Figure 1:
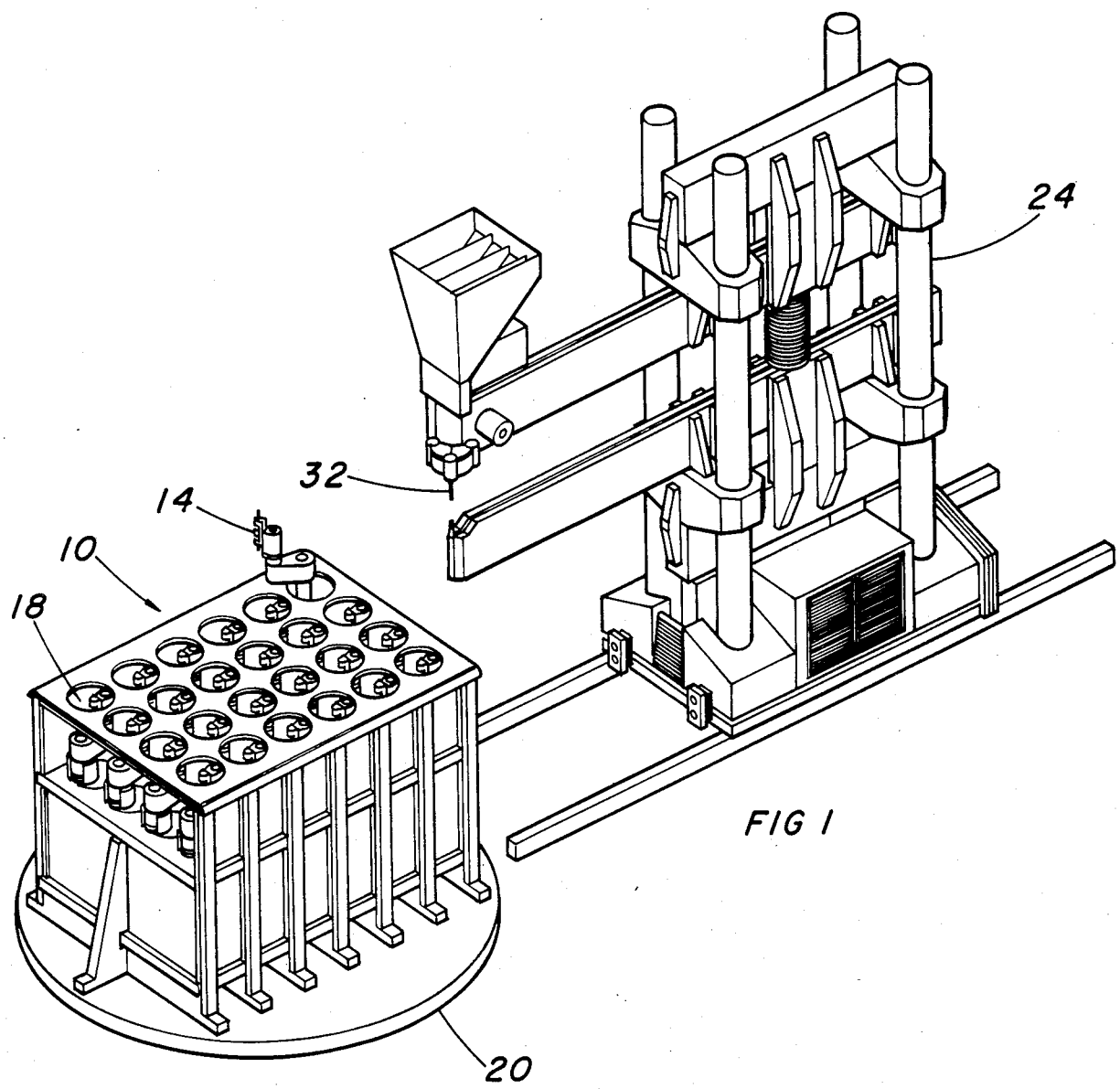
FIG. 1 is a flexible assembly jig shown positioned proximate a workpiece handling machine.

Referring now to FIG. 1, a flexible assembly jig 10 is shown with all the positioners 14 retracted into their storage chambers 18, except one positioner which is shown elevated and rotated within its operative field. The jig 10 is mounted on a base, shown as a turntable 20, for orientation relative to a machine 24 which can operate as desired on a workpiece 28, 30 (as shown in FIG. 5), when positioned on the jig. Such workpieces may be individual components or subassemblies. The machine 24 is provided with means for multi-dimensional adjustment of a tool 32 thereof relative to the jig.

A positioner unit 14 as shown assembled in FIG. 2, with a schematic representation of the movement capabilities of the components thereof shown in FIG. 3. A column 36 supports locator 40, shown as a locator tip or pin having a ledge-like shoulder 42. The column 36 is supported off center on a cylindrical base 46, which rotates about a primary axis A. The cylindrical base 46 moves an elevating shaft 50 in a circular path, eccentric to the center of the cylinder. A retaining collar 52 extends from the cylindrical base 46, and has formed therein a channel 54 for guiding retaining plates 58. The elevating shaft 50 can travel vertically and can rotate through the center of the retaining collar 52, which is located off center on the top end of the cylindrical base 46.

An extension arm 60 is supported rotatably on the elevating shaft 50 for movement about an axis B. This arm is configured with a maximum length dimension slightly less than the diameter of the cylindrical base 46 so the arm can be recessed in the minimum sized storage area 18.

The cylindrical base 46 rotates about axis A, which moves the center of elevating shaft 50, along path r. The extension arm 60 attached to the upper end of the elevating shaft 50, is free to rotate about axis B, which will move the center of a locator tip carrier shaft 62 along path s. The carrier body 64 is rotatable about axis C, to move the center line of the locating tip 40, along path t. When each component is rotated to its maximum extension and then together they are rotated about axis A, the center line of the locating tip 40 will be moved along path u, which defines the maximum boundary of the locating tip operative field (fo). The operative field defined by path u is substantially larger than the field defined by the cylindrical base 46, as it moves along path r.

Figure 4:
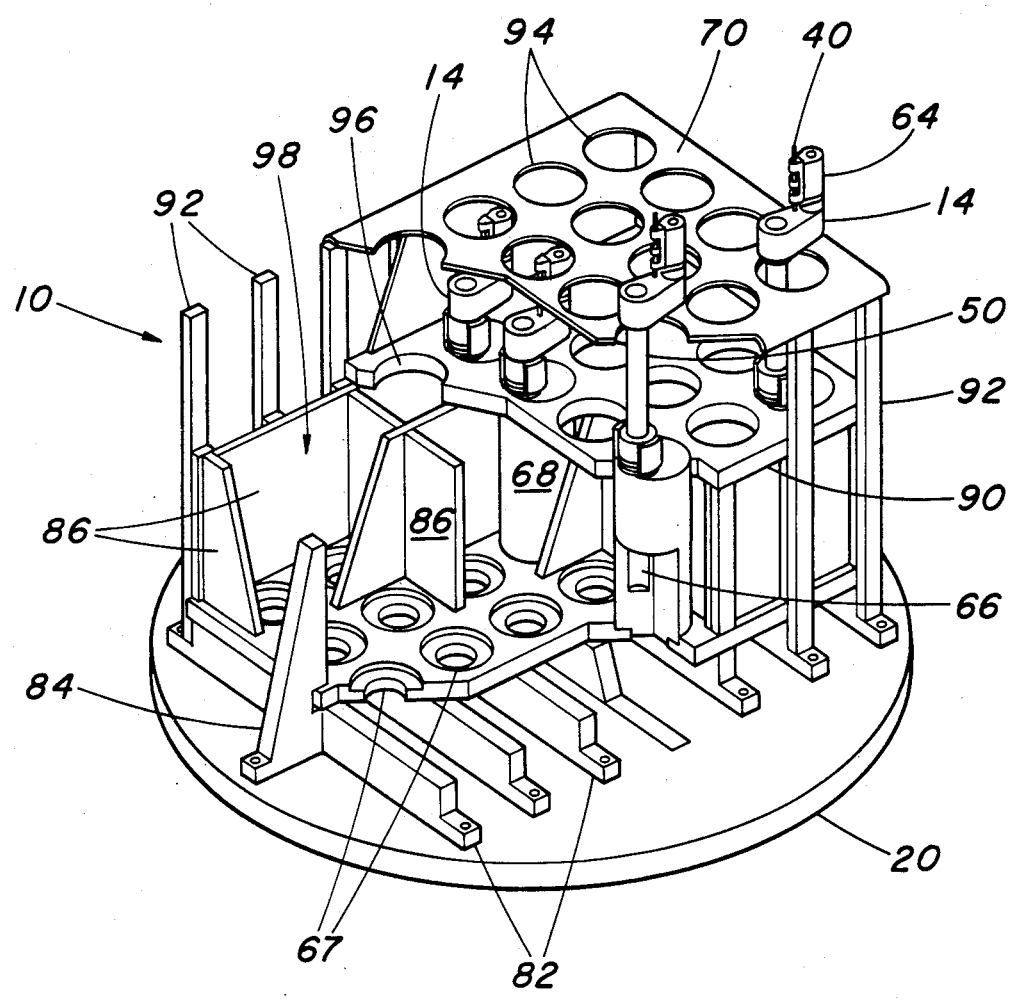
FIG. 4 is an view of a flexible assembly jig, with parts broken away for clarity.

In FIG. 4, positioner units 14 are shown at both minimum elevation or stored condition and the maximum elevation to which they can be deployed. In this cutaway elevational view of the flexible assembly jig 10, two of the positioner units are shown stored in their respective chambers, with their locating tips 40, and their carriers 64, visible below the assembly jig cap surface 70. In such stored positions, the elevating shaft 50 is recessed into a chamber 66 in the cylindrical base 46, the positioner and shaft being maintained in alignment by being seated in positioner seats 67 in the array base plate 68. Other positioners are shown deployed all or a portion of the extension range f, as shown in FIG. 3, with the elevating shafts 50 extended, and their locating tips 40, and carriers 64 above the assembly jig cap surface 70. By the extension elevator shaft 50, gross vertical adjustment of the locating tip 40 is obtained. For clarity, positioner units are not shown in the other storage chambers in FIG. 4.

The carrier 64, which rotates about axis C, supports a slide block 72 for movement over the vertical range identified by the double-headed arrow g. The slide block 72 supports the locating column 36, to which is fixed the locating tip 40. The column and its tip are adjustable by fine adjusting mechanism 74 to move the tip up and down relative to the carrier 64, over the range identified by the double-headed arrow h. The compound range of C, g and h enable the locating tip 40 to engage workpieces having varying vertical dimensions displaced from any given horizontal operating plane within the predetermined vertical range or region.

Range movement along h, whether accomplished manually or by a powered mechanism, should be treated as a fine adjustment to the more gross adjustments along range g. The high precision adjustment, which can be accomplished along range h, enables this device to position workpieces to the tolerances desired for those workpieces. By known mechanisms, adjustments to ten-thousandths of an inch can be made to the vertical extension of the locating tip 40.

As is apparent from a review of FIG. 3, rotation of the several components by selected amounts permits unrestricted positioning of a locating tip 40 in an operative field u centered over the cylindrical base 46. This operative field is defined as the area in which the locating tip 40 can be positioned for engaging workpieces similar to 28 or 30, as shown in FIG. 5. Since the operative field of a given locating tip 40 is greater than the absolute area of the cylindrical base 46 and the space between adjacent cylindrical bases, the operative fields (fo) of adjacent locating tips overlap. Due to the overlap of the fields, the locating tips of adjacent positioner units 14 can be positioned to very close proximity, relative to one another. Further, the positions of the contact points on workpieces at which the locating tips contact the workpieces need not be precisely located. Thus, the contact points, to ensure engagement of the workpieces by the locating tips, may be predetermined holes for accepting screws and rivets, and/or engaging surfaces for enabling alignment of workpieces to be formed into assemblies.

Referring now to FIG. 4, the jig 10 is shown as supported on the circular base plate 20. Attached to this circular base plate are base risers 82, and end buttress portions 84. Structure plates 86 separate the array base plate 68 from the array top plate 90. As indicated by arrow 98, the plates create storage cells of a size sufficient to accommodate positioner units 14. The assembly jig cap 70, is supported above the array top plate 90 by cap supports 92, constructed with a plurality of cap openings 94 aligned with the positioner cavities 96 in the top plate. Further, the openings 94 are centered over the positioner seats 67, formed in the array base plate 68. The cap opening 94, the positioner cavity 96, and the positioner seat 67, taken together form the positioner storage chamber shown as two chambers to a cell 98. The cap openings 94 are dimensioned to be of a diameter slightly greater than the diameter of the cylindrical base 46.

Geometrically, locating tips 40 can be positioned in a relatively large cylindrical, unrestricted area above the center of each cylindrical base 46. This cylindrical area extends from the assembly jig cap 70 upwardly to a maximum to which the locating tip 40 can be positioned. A given positioner unit 14 is spaced from the centers of adjacent positioner units by a distance equal to the maximum diameter to which the center of the locating tip 40 thereof can be positioned. That is, the locating tip 40 of one positioner unit, when at its maximum horizontal extension covering an operative field (fo), can be positioned over the center of all adjacent positioner units. Due to the overlap, certain areas of a workpiece are accessible by at least two locator elements, while other interior areas are accessible by the locating tips on three, four, or five positioner units.

In this preferred embodiment, as illustrated in FIG. 6, the flexible assembly jig 10 is configured to accommodate twenty-four positioner units 14, arranged in a pattern of straight rows and files. Four positioner units 14 are shown in various stages of extension. One of the positioner units has been extended to its maximum, and is shown tracing an arc u which defines the operative field (fo) of that unit. Another positioner unit is shown with the locating tip 40 aligned over the center of the chamber. In mathematical terms, an operative field (fo) for a particular positioner unit can be identified as that unit's domain. Operative fields (fo) for other positioner units as shown in FIG. 6 illustrate how adjacent fields overlap. For clarity, as to how fields overlap, most of the positioner units 14 have not been shown.

A typical workpiece positioning arrangement of this flexible assembly jig 10 is shown in FIG. 5. Most of the positioner units are stored below the assembly jig cap 70, while others are elevated to predetermined heights to accommodate workpieces 28 and 30. Following elevation, rotation and extension of the various components of the positioner units 14, the locating tips 40 are able to coordinate workpieces which will be supported on the locating ledge or shoulder 42, which, as shown in FIG. 2, encircles the tip 40 a predetermined dimension below the free end.

In the embodiment of FIG. 5, workpiece 30 is located on several substantially aligned locator elements. Thereafter, workpiece 28 is positioned appropriately on other locator elements, including a locator element common to those positioning workpiece 30. The precisely positioned workpieces may then be joined fixedly as by welding or other attaching methods. Continued positioning of other workpieces on the shown and/or other locator elements will enable completion of construction of an assembly which may be complete in itself may or be a subassembly. Because the components of the assembly are aligned one to the other by the locator elements, resulting assemblies have a minimum of the variations which might otherwise occur due to manufacturing tolerances.

Following assembly of workpieces as shown in FIG. 5, the locator elements may be relocated by not shown power means controlled either manually or by any of the known automatic machine control systems including computer directed numerical control systems. Assuming the latter type of control, the positioner units 14 can be selected and almost instantaneously moved into place for multi-dimensional location of other workpieces for processing and/or forming into an assembly. With this flexible jig assembly, the same high degree of precision can be obtained from configuration to configuration. Further, significant savings are achieved, through the reduction in lost time and the costs which would be experienced upon set-up and tear down of single function jigs.

Although the exemplary embodiment disclosed herein is preferred, it will be apparent to those skilled in the art that numerous modifications and refinements are intended to be covered by the scope of the appended claims.

I claim:

1. A flexible assembly jig for positioning a workpiece multidimensional, the jig comprising a plurality of positioner units;
    locator means on each said unit for engaging a workpiece for multidimensional location;
    each locator means being actuatable in three-dimensions into unrestricted operative positions, including positions in horizontal fields overlapping the horizontal fields of operative position of locator means of adjacent positioner units;
    each said positioner unit including locator means gross adjustment means, and locator means fine adjustment means, the gross adjustment means including a rotationally and vertically adjustable eccentric means supporting an arm for movement about an axis defined by positioning of the eccentric means, and the fine adjustment means including a rotationally and vertically adjustable locator carrier means arranged proximate an end of said arm remote from the axis positioned by said eccentric means and positionable to support said locator means in an operating field beyond the maximum elevation field to which the gross and fine adjustment means are vertically adjustable said locator carrier means further supporting a second locator means fine adjustment means for final elevation of said locator means.

2. A flexible assembly jig as in claim 1, said locator means being a pin engageable into a hole in the workpiece.

3. A flexible assembly jig as in claim 1, wherein said positioner unit includes eccentric means adjustable for positioning of said locator means in a horizontal field.

4. A flexible assembly jig as in claim 1, wherein said positioner unit includes means adjustable vertically for displacing said locator means from said chamber means into a selected operating field.

5. A flexible assembly jig as in claim 1, wherein said positioner unit includes arm means rotatable about an axis positioned by eccentric means.

6. A flexible assembly jig as in claim 1, wherein said positioner unit includes arm means having a length not greater than the diameter of said chamber means, said arm supporting said locator means proximate the end thereof remote from an axis positioned by eccentric means being one of said elements of said positioner unit.

7. A flexible assembly jig as in claim 1, wherein the locator carrier means is positionable to support said locator means in an operating field beyond the dimension of said chamber means, and into overlapping relationship with operating fields of locator means of adjacent positioner units.

8. A flexible assembly jig as in claim 1, wherein the locator carrier means comprises a rotatable portion supporting an angularly and longitudinally positionable slide means.

9. A flexible assembly jig as in claim 1, wherein said storage chamber means is of a depth less than the maximum extended dimension to which the locator means is adjustable.

10. A flexible assembly jig as in claim 1, wherein said chamber means open to a workpiece supporting surface.

11. An assembly jig comprising a base, a plurality of first positioners each having a longitudinal axis and each extending for operation into a region defined by directions extending away from one side of said base;
    first support means mounted on said base for supporting said first positioners in spaced locations about said region;
    each of said first positioners including locator means rotatably coupled to an endface of the corresponding positioner and rotatable about an axis generally parallel to the longitudinal axis of the corresponding positioner for engaging and positioning an element of a first workpiece at a supported point so that collectively the workpiece is supported in a predetermined position;
    each locator means being constructed for activation in a plurality of unrestricted operative positions including certain positions laterally extending into overlapping relation with the fields of adjacent positioners;
    a plurality of second positioners, each having a longitudinal axis and each extending for operation into a region defined by directions extending away from one side of said base;
    second support means mounted on said base for supporting said second positioners in spaced locations about said region;
    each said second positioners including locator means rotatably coupled to an endface of the corresponding positioner and rotatable about an axis generally parallel to the longitudinal axis of the corresponding positioner for engaging and positioning an element of a second workpiece at a supported point so that collectively the second workpiece is supported in a second predetermined position precisely related to the first workpiece;
    each locator means being constructed for activation in a plurality of unrestricted operative positions including certain positions laterally extending into overlapping relation with the fields of adjacent positioners;
    each positioner includes locator means gross adjustment means, and locator means fine adjustment means, said gross adjustment means includes an eccentric means providing rotational and vertical adjustment and supports an arm for movement about an axis defined by positioning of the eccentric means, and said fine adjustment means includes a locator carrier means providing rotational and vertical adjustment and arranged proximate the end of said arm remote from the axis positioned by said eccentric means.

12. The assembly jig as in claim 11 in which said first and second support means include means for precisely moving each locator means both towards and away from the base and laterally about an area thereover which overlaps areas of movement of adjacent positioners to thereby cover all positions over said surface.

13. A flexible assembly jig for positioning a plurality of workpieces for assembly, said workpieces being fabricated with locator means engageable elements thereon, comprising:

a plurality of spaced positioner means lying generally below a surface and including locator means thereon for engaging the respective workpiece element;

said positioners being oriented for translational movement upwardly from beneath said surface and constructed so that the locator means is always the positioner part furthest away from the surface when the positioner projects therethrough wherein a plurality of locator means can support a workpiece without obstructing a region of space bounding the sides of the workpiece;

actuator means for individually and independently elevating each of said positioner means to any of a set predetermined elevations above said surface;

each of said positioner means further including means, rotatably connected to an endface of the positioner, for locator means positional movement throughout a range of positions generally laterally to said translational movement and over a range of locations overlapping the ranges of lateral movement positions of adjacent locator means;

means for individually and independently moving each locator means throughout its lateral range so that at least one locator means is available to be positioned in any position in the volume defined by said surface and the height to which the positioners can be elevated.

14. The assembly jig as in claim 10 further including chamber cover means mounted to extend over said horizontal surface and having openings therethrough directly above each positioner so that the latter are moveable by being selectively raised or lowered through each such opening and further moveable above said cover means to selected lateral positions.

15. A flexible assembly jig for positioning a workpiece comprising:

a base structure;

a plurality of positioner shafts coupled to the base structure each having a longitudinal axis oriented generally perpendicular to a plane of the base structure;

a displacement shaft attached to an endface of the positioner shaft and oriented generally parallel with the positioner shaft, the displacement shaft engaging the positioner shaft at a point off a longitudinal center line axis of the positioner shaft;

means for independently translating the displacement shaft with respect to the positioner shaft;

a first arm rotatably coupled at a first end to a displacement shaft end furthest from the base about an axis generally parallel to the positioner longitudinal axis;

a second arm rotatably coupled at one end to a second end of the first arm and rotating about an axis generally parallel to the first arm rotational axis;

locator means, operatively coupled to the second arm, for engaging the workpiece; and means for independently rotating the positioners shafts about their respective longitudinal axis.

16. The flexible assembly jig of claim 15 wherein the rotational axis of the first arms are offset from the center of the positioner shaft endfaces.

* * * * *

UNITED STATES PATENT AND TRADEMARK OFFICE
CERTIFICATE OF CORRECTION

PATENT NO. : 4,641,819

DATED : February 10, 1987

INVENTOR(S) : David A. Poland

It is certified that error appears in the above-identified patent and that said Letters Patent is hereby corrected as shown below:

In Claim 14, line 1, delete "10" and substitute -- 13 --.

Signed and Sealed this

Eleventh Day of August, 1987

Attest:

DONALD J. QUIGG

*Attesting Officer*     *Commissioner of Patents and Trademarks*